United States Patent
Arao et al.

(10) Patent No.: US 11,703,644 B2
(45) Date of Patent: Jul. 18, 2023

(54) MANUFACTURING METHOD FOR MANUFACTURING MULTIFIBER CONNECTOR AND MULTI-FIBER CONNECTOR

(71) Applicant: SUMITOMO ELECTRIC INDUSTRIES, LTD., Osaka (JP)

(72) Inventors: Hajime Arao, Osaka (JP); Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 155 days.

(21) Appl. No.: 17/372,592

(22) Filed: Jul. 12, 2021

(65) Prior Publication Data

US 2022/0019025 A1 Jan. 20, 2022

(30) Foreign Application Priority Data

Jul. 17, 2020 (JP) ................................. 2020-122971

(51) Int. Cl.
*G02B 6/25* (2006.01)
*G02B 6/38* (2006.01)

(52) U.S. Cl.
CPC .............. *G02B 6/25* (2013.01); *G02B 6/3863* (2013.01); *G02B 6/3843* (2013.01); *G02B 6/3885* (2013.01)

(58) Field of Classification Search
None
See application file for complete search history.

(56) References Cited

U.S. PATENT DOCUMENTS

| | | | | |
|---|---|---|---|---|
| 6,519,406 B1* | 2/2003 | Fukuyama | ........... | G02B 6/3839 |
| | | | | 385/137 |
| 9,069,144 B2* | 6/2015 | Bradley | ............... | G02B 6/3851 |
| 9,851,509 B2* | 12/2017 | Pfnuer | ................. | G02B 6/3652 |
| 10,139,574 B2* | 11/2018 | Watanabe | ............ | G02B 6/3839 |
| 10,585,235 B2* | 3/2020 | Sakamoto | ............ | G02B 6/3885 |
| 2006/0245695 A1* | 11/2006 | Fujiwara | .............. | G02B 6/3885 |
| | | | | 385/71 |
| 2011/0229086 A1* | 9/2011 | Bradley | ................. | G02B 6/245 |
| | | | | 385/129 |
| 2012/0219255 A1 | 8/2012 | Bradley et al. | | |
| 2015/0247978 A1* | 9/2015 | Bradley | ............. | G02B 6/02042 |
| | | | | 156/250 |
| 2017/0168247 A1* | 6/2017 | Watanabe | ............ | G02B 6/3839 |

FOREIGN PATENT DOCUMENTS

WO 2016-031678 A1 3/2016

* cited by examiner

*Primary Examiner* — Jerry Rahll
(74) *Attorney, Agent, or Firm* — Oliff PLC

(57) ABSTRACT

A manufacturing method for manufacturing a multi-fiber connector, including: shaping a part of each of a plurality of optical fibers such that a part of an outer peripheral surface of a glass fiber including one end portion becomes a flat surface; arranging each of the plurality of optical fibers in a positioning component such that the entire flat surface protrudes from the positioning component; rotationally aligning each of the plurality of optical fibers such that the flat surface comes into contact with a reference surface of a jig; fixing each of the plurality of optical fibers to the positioning component; and cutting and removing a part of the glass fiber which protrudes from the positioning component and includes the flat surface and grinding a cut surface of each of the plurality of optical fibers which is exposed from the positioning component.

8 Claims, 9 Drawing Sheets

MANUFACTURING METHOD FOR MANUFACTURING MULTIFIBER CONNECTOR AND MULTI-FIBER CONNECTOR

CROSS-REFERENCE TO RELATED APPLICATIONS

This application is based upon and claims the benefit of priority from prior Japanese patent application No. 2020-122971, filed on Jul. 17, 2020, the entire contents of which are incorporated herein by reference.

TECHNICAL FIELD

The present disclosure relates to a manufacturing method for manufacturing a multi-fiber connector, and a multi-fiber connector.

BACKGROUND ART

A multi-core fiber having a plurality of cores in one fiber is known. The multi-core fiber is not axisymmetric with respect to a central axis of the multi-core fiber in a sectional view. In a multi-fiber connector including a plurality of multi-core fibers, rotation alignment between each multi-core fiber and an object to be connected is required (see, for example, Patent Literature 1 and Patent Literature 2).
Patent Literature 1: US 2012/219255 A1
Patent Literature 2: WO 2016/031678 A1

SUMMARY OF INVENTION

According to an aspect of the present disclosure, there is provided a manufacturing method for manufacturing a multi-fiber connector by using a positioning component including a plurality of positioning portions configured to hold a plurality of optical fibers, each of the plurality of optical fibers being not axisymmetric, and each of the plurality of optical fibers including a glass fiber and a resin coating and having a covered portion in which the glass fiber is covered with the resin coating and a non-covered portion in which the glass fiber is exposed, the non-covered portion including one end portion of the optical fiber,
the manufacturing method including:
shaping a part of each of the plurality of optical fibers such that a part of an outer peripheral surface of the glass fiber including the one end portion becomes a flat surface;
arranging each of the plurality of optical fibers in a respective one of the plurality of positioning portions of the positioning component such that the entire flat surface protrudes from the positioning component;
rotationally aligning each of the plurality of optical fibers such that the flat surface comes into contact with a reference surface of a jig disposed to face the positioning component;
fixing each of the plurality of optical fibers to the positioning component after rotationally aligning each of the plurality of optical fibers; and
cutting and removing a part of the glass fiber which protrudes from the positioning component and includes the flat surface and grinding a cut surface of each of the plurality of optical fibers which is exposed from the positioning component, after fixing each of the plurality of optical fibers to the positioning component.

According to another aspect of the present disclosure, there is provided a multi-fiber connector including:
a plurality of optical fibers, each of the plurality of optical fibers being not axisymmetric; and
a positioning component including a plurality of positioning portions configured to hold the plurality of optical fibers,
wherein the plurality of optical fibers are held by the plurality of positioning portions respectively such that a deviation of an azimuthal angle of each of the plurality of optical fibers around a central axis of each of the plurality of optical fibers is not more than 1 degree relative to a predetermined angle in a cross-sectional view of the plurality of optical fibers.

DESCRIPTION OF EMBODIMENTS

Figure 1:
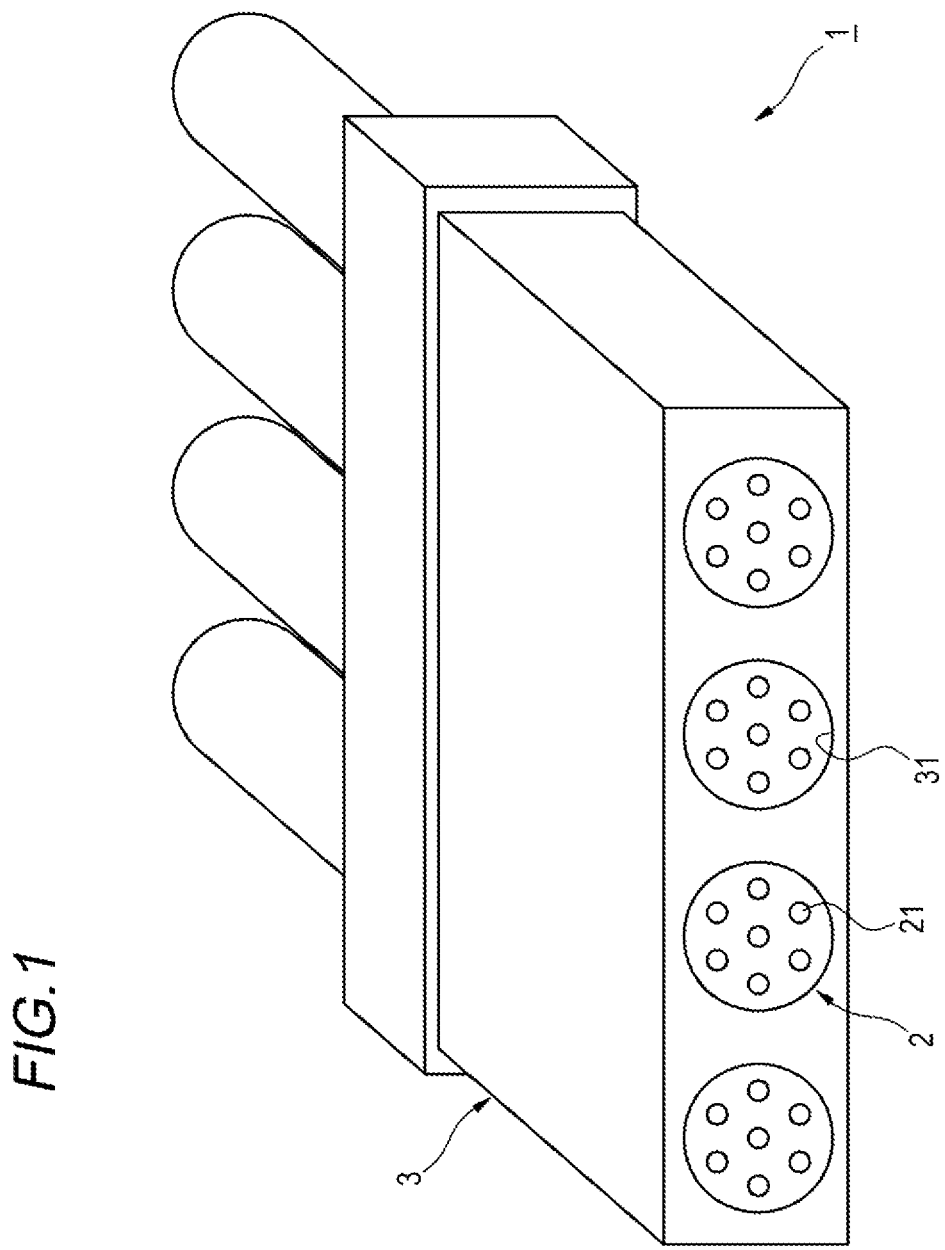
FIG. 1 is a perspective view of a multi-fiber connector according to a first embodiment of the present disclosure.

Problems to be Solved by the Present Disclosure

As an example of a method for rotation alignment, Patent Literature 1 discloses a method in which each of a plurality of multi-core fibers is provided with a flat surface in a longitudinal direction, and each of the plurality of multi-core fibers is rotationally aligned with reference to the flat surface. However, in this method, it is difficult to use a general optical fiber positioning component. For example, a ferrule as a general positioning component includes a circular hole into which an optical fiber having a circular cross section is inserted. When a general ferrule is used in Patent Literature 1, a gap is generated between the flat surface of each multi-core fiber and the hole of the ferrule, and therefore, there is a possibility that manufacturing accuracy is not secured.

As another example of the method for rotation alignment, Patent Literature 2 discloses a method for rotation alignment in which a rotation preventing member is attached to each multi-core fiber. However, a general positioning component does not assume the use of the rotation preventing member. For this reason, for example, since the positioning component does not have a space for accommodating the rotation preventing member, the general positioning component and the rotation preventing member may not be physically combined. For example, the positioning component may interfere with a member attached to an adjacent core.

Therefore, the present disclosure provides a manufacturing method for manufacturing a multi-fiber connector and a multi-fiber connector capable of performing rotation alignment with high accuracy while using a general positioning component.

Effects of the Present Disclosure

According to the present disclosure, it is possible to provide a manufacturing method for manufacturing a multi-fiber connector and a multi-fiber connector capable of performing rotation alignment with high accuracy while using a general positioning component.

Description of Aspects of Present Disclosure

First, embodiments of the present disclosure will be listed and described.

(1) According to an aspect of the present disclosure, there is provided a manufacturing method for manufacturing a multi-fiber connector by using a positioning component including a plurality of positioning portions configured to hold a plurality of optical fibers, each of the plurality of optical fibers being not axisymmetric, and each of the plurality of optical fibers including a glass fiber and a resin coating and having a covered portion in which the glass fiber is covered with the resin coating and a non-covered portion in which the glass fiber is exposed, the non-covered portion including one end portion of the optical fiber, the manufacturing method including:
shaping a part of each of the plurality of optical fibers such that a part of an outer peripheral surface of the glass fiber including the one end portion becomes a flat surface;
arranging each of the plurality of optical fibers in a respective one of the plurality of positioning portions of the positioning component such that the entire flat surface protrudes from the positioning component;
rotationally aligning each of the plurality of optical fibers such that the flat surface comes into contact with a reference surface of a jig disposed to face the positioning component;
fixing each of the plurality of optical fibers to the positioning component after rotationally aligning each of the plurality of optical fibers; and
cutting and removing a part of the glass fiber which protrudes from the positioning component and includes the flat surface and grinding a cut surface of each of the plurality of optical fibers which is exposed from the positioning component, after fixing each of the plurality of optical fibers to the positioning component.

According to the manufacturing method of the present disclosure, each of the plurality of optical fibers is rotated such that the flat surface formed on each of the plurality of optical fibers comes into contact with the reference surface of the jig disposed to face the positioning component, so that rotation alignment can be performed with high accuracy.

In addition, each of the plurality of optical fibers is arranged in the positioning component such that the entire flat surface protrudes from the positioning component, so that a cross section perpendicular to the longitudinal direction of the glass fiber in the positioning component is a circle. Since each of the plurality of optical fibers has the same cross section as that of a general optical fiber, each optical fiber can be used as it is for a general optical fiber positioning portion. Further, the jig is disposed to face the positioning component, so that it is easy to use the jig together with the positioning component.

(2) Each of the plurality of optical fibers may be a multi-core fiber.

According to the manufacturing method of the present disclosure, a general optical fiber positioning portion can be used, and the rotation alignment of the multi-core fiber can be performed with high accuracy.

(3) The shaping the part of each of the plurality of optical fibers may include removing a part of at least one core of each of the plurality of optical fibers.

According to the present disclosure, the shaping the part of each of the plurality of optical fibers includes removing a part of at least one core of each of the optical fibers, so that an area of the flat surface can be secured. Since the area of the flat surface in contact with the reference surface of the jig is large, rotation alignment can be performed with higher accuracy.

(4) The flat surface of each of the plurality of optical fibers may be parallel to a central axis of the optical fiber.

According to the present disclosure, the flat surface is parallel to the central axis of the optical fiber, so that it is easy to dispose the jig such that the flat surface and the reference surface of the jig come into contact with each other. Therefore, the rotation alignment of the optical fiber can be performed with high accuracy.

(5) The flat surface of each of the plurality of optical fibers may be inclined with respect to a central axis of the optical fiber.

According to the present disclosure, the flat surface is inclined with respect to the central axis of the optical fiber, so that the reference surface of the jig can be guided along the inclined flat surface from a distal end side of the optical fiber toward the positioning component. Therefore, the rotation alignment of the optical fiber can be performed with high accuracy.

(6) The plurality of positioning portions may be a plurality of holes or a plurality of grooves.

According to the present disclosure, a general positioning component such as a ferrule having a hole or a fiber array plate having a groove can be used.

(7) The shaping the part of each of the plurality of optical fibers may include removing the part of the outer peripheral surface of the glass fiber with laser light.

The part of the outer peripheral surface of the glass fiber is removed by the laser, so that the flat surface can be formed with higher accuracy than in a grinding process.

(8) The shaping the part of each of the plurality of optical fibers may include grinding the part of the outer peripheral surface of the glass fiber with an optical connector grinding machine.

The part of the outer peripheral surface of the glass fiber is removed by grinding, so that the flat surface can be formed at a lower cost than in the laser processing.

(9) According to another aspect of the present disclosure, there is provided a multi-fiber connector including:

a plurality of optical fibers, each of the plurality of optical fibers being not axisymmetric; and a positioning component including a plurality of positioning portions configured to hold the plurality of optical fibers, wherein the plurality of optical fibers are held by the plurality of positioning portions respectively such that a deviation of an azimuthal angle of each of the plurality of optical fibers around a central axis of each of the plurality of optical fibers is not more than 1 degree relative to a predetermined angle in a cross-sectional view of the plurality of optical fibers.

According to the present disclosure, it is possible to provide a multi-fiber connector capable of performing rotation alignment with high accuracy.

Details of First Embodiment of Present Disclosure

A multi-fiber connector 1 and a manufacturing method for manufacturing the multi-fiber connector 1 according to one embodiment of the present disclosure will be described with reference to the drawings.

Incidentally, the present invention is not limited to these examples but is indicated by the scope of claims, and is intended to include meanings equivalent to the scope of claims and all modifications within the scope thereof.

FIG. 1 is a perspective view of the multi-fiber connector 1 according to a first embodiment of the present disclosure. As shown in FIG. 1, the multi-fiber connector 1 includes a plurality of optical fibers 2 and a positioning component 3 that holds the plurality of optical fibers 2.

Each optical fiber 2 is an optical fiber that is not axisymmetric with respect to a central axis thereof. In this example, each optical fiber 2 is a multi-core fiber including a plurality of cores 21. Each optical fiber 2 may be a polarization maintaining fiber. Each of the optical fibers 2 is fixed to the positioning component 3 such that an end face thereof is exposed at an end portion of the positioning component 3. An outer diameter of each optical fiber 2 is, for example, 125 μm. Since the optical fibers 2 are not axisymmetric, it is necessary to perform rotation alignment on the optical fibers 2 in a manufacturing process of manufacturing the multi-fiber connector 1. The manufacturing process of the multi-fiber connector 1 will be described later.

The positioning component 3 includes a plurality of positioning portions 31 configured to hold the plurality of optical fibers 2. In this example, each of the positioning portions 31 is a circular hole that accommodates each of the optical fibers 2, respectively. The positioning portion 31 is not limited to a circular hole, and may be a V-groove. The positioning component 3 is, for example, a ferrule. An inner diameter of the positioning portion 31 is slightly larger than the outer diameter of the optical fiber 2, and is, for example, 126 μm.

Figure 2:
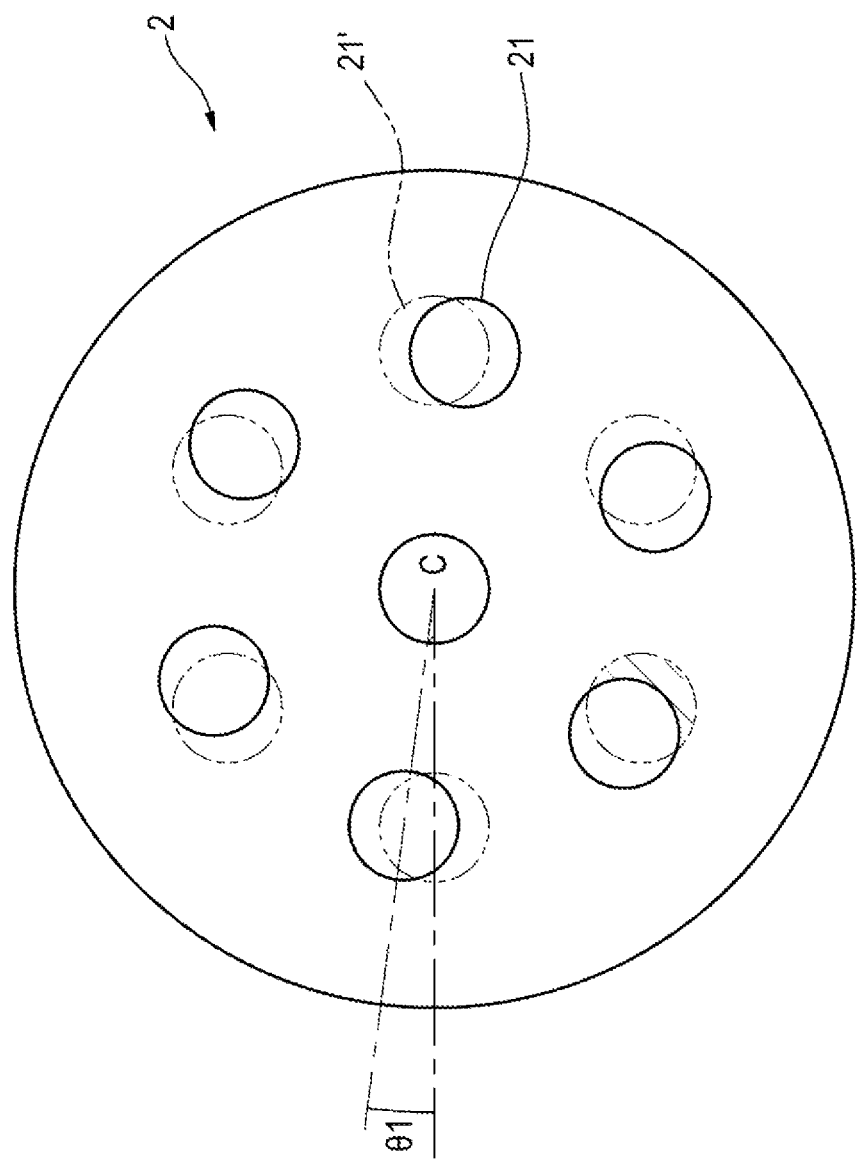
FIG. 2 is a front view of an end face of an optical fiber fixed to a positioning component of the multi-fiber connector shown in FIG. 1.

FIG. 2 is a front view of an end face of one optical fiber 2 fixed to the positioning component 3 of the multi-fiber connector 1 shown in FIG. 1. As shown in FIG. 2, in the manufacturing process of the multi-fiber connector 1, it is ideal that the optical fibers 2 are rotationally aligned such that each core 21' is located at a predetermined position indicated by a broken line and is fixed to the positioning component 3. However, there may be some deviation in an azimuthal angle of each optical fiber 2. Actually, as shown in FIG. 2, the optical fiber 2 is rotationally aligned such that each core 21 is located at a position indicated by a solid line, and is fixed to the positioning component 3. As described above, each optical fiber 2 has a deviation $\theta 1$ in the azimuthal angle around a central axis C of the optical fiber 2 between the predetermined position (position of the broken line) and the position after rotation (position of the solid line). The deviation $\theta 1$ of the azimuthal angle of the multi-fiber connector 1 is not more than 1 degree in this example.

Next, the manufacturing method for manufacturing the multi-fiber connector 1 will be described. FIGS. 3 to 7B are process diagrams of the manufacturing method for the multi-fiber connector 1.

Figure 3:
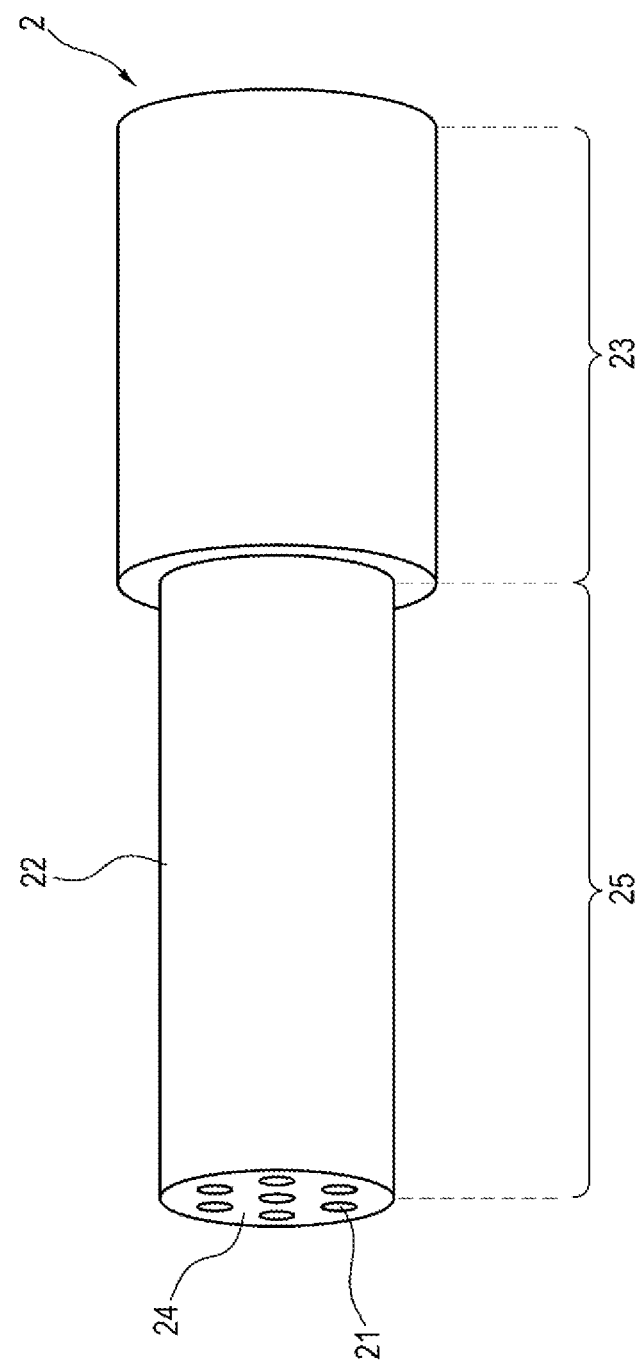
FIG. 3 is a diagram showing a preparation step of a manufacturing method for a multi-fiber connector, and is a perspective view of an optical fiber.

FIG. 3 is a diagram showing a preparation step of the manufacturing method for manufacturing the multi-fiber connector 1, and is a perspective view of the optical fiber 2 used for the multi-fiber connector 1. As shown in FIG. 3, the optical fiber 2 includes a covered portion 23 in which a glass fiber 22 is covered with a resin coating, and a non-covered portion 25 that includes one end portion 24 of the optical fiber 2 and in which the glass fiber 22 is exposed. A material for the glass fiber 22 is, for example, quartz glass, and has a cylindrical shape. In the preparation step, a plurality of optical fibers 2 that are not axisymmetric as shown in FIG. 3 are prepared. In the preparation step of the present embodiment, the optical fiber 2 having the covered portion 23 and the non-covered portion 25 in advance is prepared, but the preparation step is not limited thereto. An optical fiber may be prepared by removing a resin coating from an optical fiber covered with the resin coating over an entire length in the longitudinal direction at a part in the longitudinal direction including a distal end portion to form a non-covered portion.

Figure 4:
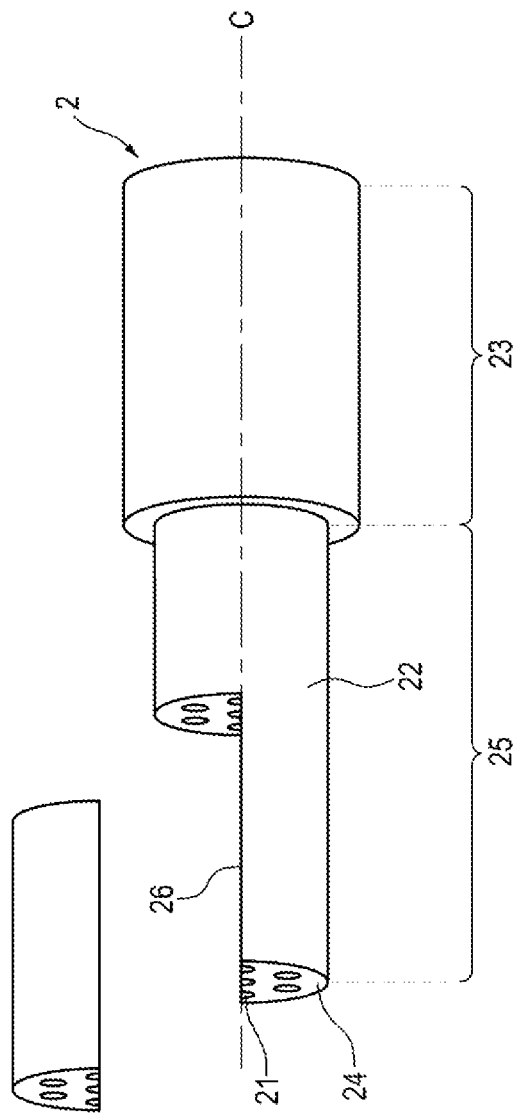
FIG. 4 is a conceptual diagram showing a first step of the manufacturing method for a multi-fiber connector.
Figure 4:
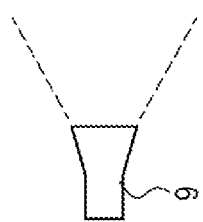

FIG. 4 is a conceptual diagram showing a first step of the manufacturing method for manufacturing the multi-fiber connector 1. As shown in FIG. 4, a part of the optical fiber 2 is shaped so that a part of an outer peripheral surface of the glass fiber 22 including the one end portion 24 becomes a flat surface 26 (first step).

First, the optical fiber 2 is positioned in a predetermined direction. At this time, it is confirmed that the optical fiber 2 is positioned at an appropriate position and orientation by a camera 9 disposed toward the one end portion 24 of the optical fiber 2. Next, the flat surface 26 is formed on the positioned optical fiber 2 by a laser or an optical connector grinding machine. Since the part of the optical fiber 2 is shaped in a state where the optical fiber 2 is positioned with high accuracy by the camera 9, the flat surface 26 is also formed in a highly accurate position and orientation with respect to the optical fiber 2. At this time, the part of the optical fiber 2 may be shaped while being observed by the camera 9 to form the flat surface 26. In this way, each of the plurality of optical fibers 2 forms the flat surface 26 that is positioned with high accuracy. Here, when a femtosecond laser is used, processing with higher accuracy is possible.

As shown in FIG. 4, the flat surface 26 is formed by removing a part of at least one core 21 of the optical fiber 2. The flat surface 26 is parallel to the central axis C of the optical fiber 2. Although the flat surface 26 is formed on the central axis C in the present example, the position of the flat surface 26 is not limited to be on the central axis C. A length of the flat surface 26 in the longitudinal direction is not particularly limited, as long as the flat surface 26 is formed such that the flat surface 26 does not exist in the positioning portion 31 when the optical fiber 2 is inserted into the positioning portion 31 of the positioning component 3. The flat surface 26 is formed so as to protrude from the positioning portion 31 toward the one end portion 24.

Figure 5A:
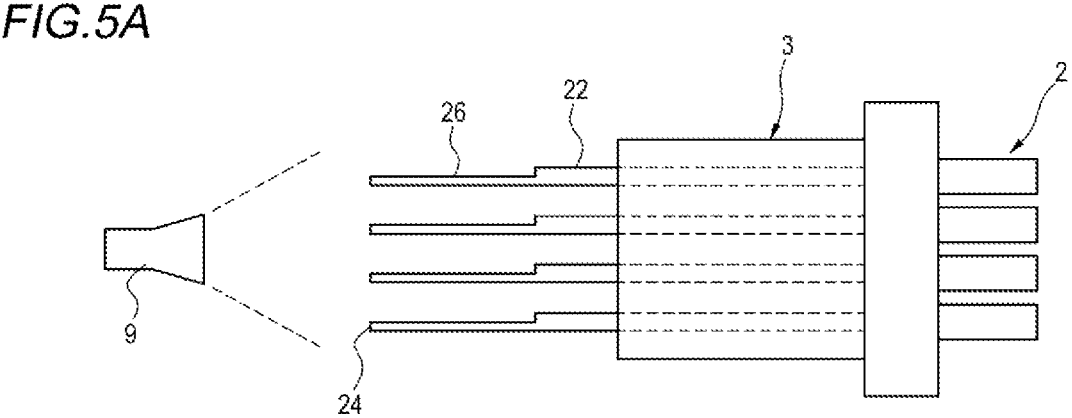
FIG. 5A is a diagram showing a second step of the manufacturing method for a multi-fiber connector, and is a plan view seen from a direction orthogonal to an arrangement plane of the optical fiber.
Figure 5B:
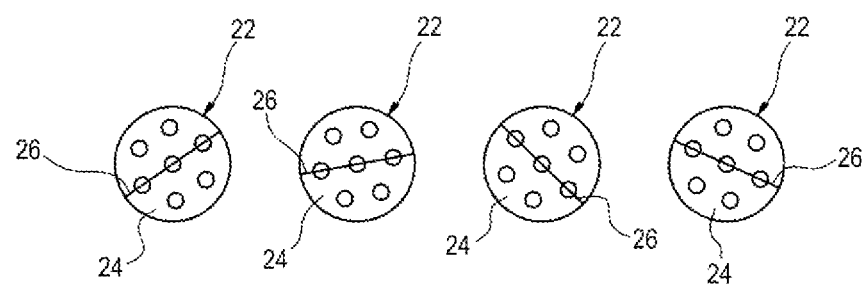
FIG. 5B is a front view of the optical fiber shown in FIG. 5A.

FIGS. 5A and 5B are diagrams showing a second step of the manufacturing method for manufacturing the multi-fiber connector 1. FIG. 5A is a plan view of the optical fibers 2 and the positioning component 3, together with the camera 9, viewed from a direction orthogonal to an arrangement plane of the optical fibers 2, and FIG. 5B is a front view of the optical fibers 2 shown by the camera 9 disposed toward the one end portion 24 of each optical fiber 2 shown in FIG. 5A. As shown in FIG. 5A, each of the plurality of optical fibers 2 with a part shaped in the first step is inserted through the positioning portions 31 of the positioning component 3, and is arranged such that the flat surface 26 protrudes from an end face of the positioning portion 31 (second step). At this time, as shown in FIG. 5B, the optical fibers 2 are not rotationally aligned yet, and the flat surfaces 26 are arranged in different orientations from each other.

Figure 6A:
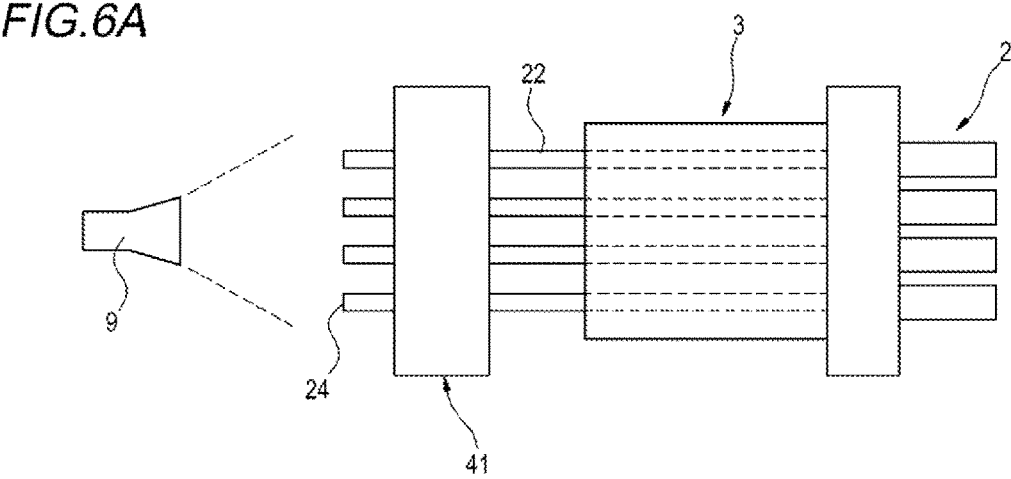
FIG. 6A is a diagram showing a third step and a fourth step of the manufacturing method for a multi-fiber connector, and is a plan view seen from the direction orthogonal to the arrangement plane of the optical fiber.
Figure 6B:
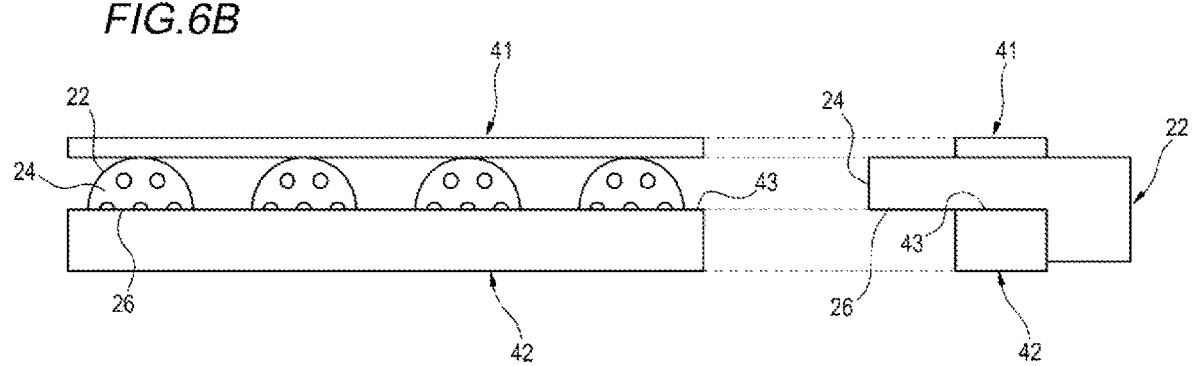
FIG. 6B is a front view and a side view of the optical fiber shown in FIG. 6A.

FIGS. 6A and 6B are diagrams showing a third step and a fourth step of the manufacturing method for manufacturing the multi-fiber connector 1. FIG. 6A is a plan view of the optical fibers 2 and the positioning component 3, together with the camera 9, viewed from the direction orthogonal to the arrangement plane of the optical fibers 2, and FIG. 6B is a front view of the optical fibers 2 shown by the camera 9 disposed toward the one end portion 24 of each optical fiber 2 shown in FIG. 6A and a side view of the vicinity of the one end portion 24 of the optical fiber 2 as viewed from an arrangement direction of the optical fibers 2. As shown in FIGS. 6A and 6B, a pair of jigs 41 and 42 is used in the third step and the fourth step. Each jig 41 and 42 has a rectangular parallelepiped shape. The jig 41 is disposed on the circumference of the glass fibers 22 at a position facing the positioning component 3, and the jig 42 is disposed toward the flat surfaces 26 of the glass fibers 22 at a position facing the positioning component 3. The jig 42 has a reference surface 43 formed on a surface facing the optical fibers 2 so as to be parallel to the longitudinal direction of the optical fibers 2. That is, the pair of jigs 41 and 42 disposed to face the positioning component 3 are arranged so as to sandwich the plurality of optical fibers 2 arranged in the second step in an upper-lower direction. The jig 42 is disposed along the flat surface 26 formed to protrude from the positioning portion 31 toward the one end portion 24. At this time, as shown in FIG. 6B, each optical fiber 2 is rotationally aligned such that the flat surface 26 comes into contact with the reference surface 43 formed on the jig 42 (third step). In the present example, the reference surface 43 is disposed so as to be parallel to the central axis C of each optical fiber. Since the flat surface 26 is also parallel to the central axis C, all of the flat surfaces 26 of the plurality of optical fibers 2 are in contact with the reference surface 43, and the orientations thereof are unified. At this time, it is confirmed that the plurality of optical fibers 2 are appropriately rotationally aligned by the camera 9 disposed toward the one end portion 24.

Each of the optical fibers 2 subjected to the rotation alignment is fixed to the positioning portion 31 of the positioning component 3 (fourth step). As a fixing method, an adhesive may be applied to each optical fiber 2 and hardened. The adhesive is, for example, an epoxy-based adhesive. At this time, each optical fiber 2 is held and fixed to the positioning portion 31 in a state observed by the camera 9 so that the deviation θ1 in the azimuthal angle is not more than 1 degree. The optical fibers 2 may be fixed in a state where the pair of jigs 41 and 42 is removed from the optical fibers 2.

Figure 7A:
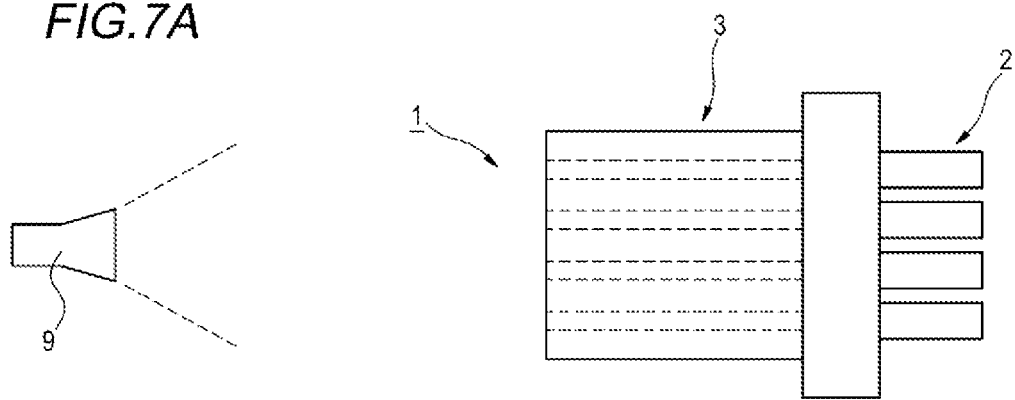
FIG. 7A is a diagram showing a fifth step of the manufacturing method for a multi-fiber connector, and is a plan view seen from the direction orthogonal to the arrangement plane of the optical fiber.
Figure 7B:
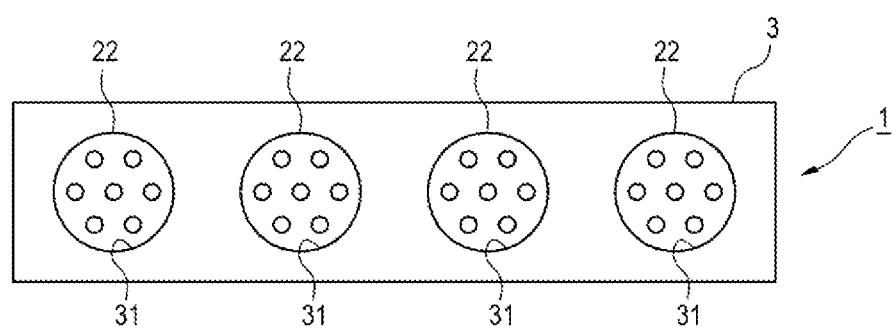
FIG. 7B is a front view of the optical fiber shown in FIG. 7A.

FIGS. 7A and 7B are diagrams showing a fifth step of the manufacturing method for manufacturing the multi-fiber connector 1. FIG. 7A is a plan view of the optical fibers 2 and the positioning component 3, together with the camera 9, viewed from the direction orthogonal to the arrangement plane of the optical fibers 2, and FIG. 7B is a front view of the optical fibers 2 shown by the camera 9 disposed toward the optical fibers 2 shown in FIG. 7A. As shown in FIGS. 7A and 7B, of the optical fiber 2 fixed in the third step, a portion including the flat surface 26 of the glass fiber 22 protruding from the positioning component 3 is cut off and removed (fifth step). Then, as shown in FIG. 7B, a cut surface of the optical fiber 2 exposed from the positioning component 3 is ground (fifth step), and the multi-fiber connector 1 is completed.

As described above, in the manufacturing method for manufacturing the multi-fiber connector 1 according to the present embodiment, each of the optical fibers 2 are rotationally aligned such that the flat surfaces 26 formed on the optical fibers 2 are in contact with the reference surface 43 of one jig 42 of the pair of jigs 41 and 42 disposed to face the positioning component 3, and therefore, the plurality of optical fibers 2 can be rotationally aligned at one time with high accuracy. Therefore, the work efficiency is improved.

In addition, each of the optical fibers 2 is arranged in a respective one of the positioning portions 31 of the positioning component 3 such that the entire flat surface 26 protrudes from the positioning component 3, so that a cross section perpendicular to the longitudinal direction of the glass fiber 22 in the positioning portion 31 is a circle, and there is no flat surface in the positioning portion 31. Since the optical fiber 2 has the same circular cross section as that of a general optical fiber, each optical fiber 2 can be used as it is for a general optical fiber positioning component 3 such as a fiber array plate provided with a ferrule or a V groove. That is, there is no need to use a special member for rotation alignment or rotation prevention. Furthermore, the pair of jigs 41 and 42 is disposed to face the positioning component 3, so that it is easy to use the pair of jigs 41 and 42 together with the positioning component 3. Therefore, the multi-fiber connector 1 can be manufactured without significantly increasing the manufacturing cost.

Since each of the optical fibers 2 is a multi-fiber fiber, it is possible to provide the multi-fiber connector 1 capable of large-capacity transmission.

The flat surface 26 is formed by removing a part of at least one core 21 of each of the optical fibers 2, so that a large area of the flat surface 26 is secured. An area of the flat surface 26 in contact with the reference surface 43 of the jig 42 is large, so that the rotation alignment of the optical fibers 2 can be performed with high accuracy, and the working efficiency is also improved.

The flat surface 26 of each of the optical fibers 2 is parallel to the central axis C of the optical fiber 2, so that it is easy to dispose the pair of jigs 41 and 42 such that the flat surface 26 and the reference surface 43 of the jig 42 come into contact with each other. Therefore, it is possible to provide the multi-fiber connector 1 including the optical fibers 2 that are rotationally aligned with high accuracy.

The plurality of positioning portions 31 included in the positioning component 3 are a plurality of holes or a plurality of grooves, so that a general positioning component such as a ferrule having a hole or a fiber array plate having a groove can be used. Therefore, the multi-fiber connector 1 can be manufactured without significantly increasing the manufacturing cost.

In the first step, the part of the outer peripheral surface of the glass fiber 22 is removed by the laser, so that the flat surface 26 can be formed with higher accuracy than in a grinding process. Therefore, it is possible to manufacture the multi-fiber connector 1 including the optical fibers 2 that are rotationally aligned with high accuracy.

In the first step, the part of the outer peripheral surface of the glass fiber 21 is removed by the optical connector grinding machine, so that the flat surface 26 can be formed at a lower cost than the laser processing. Therefore, the multi-fiber connector 1 can be manufactured with a reduced manufacturing cost.

The deviation θ1 of the azimuthal angle of each of the optical fibers 2 around the central axis C of each of the optical fibers 2 is not more than 1 degree relative to a predetermined angle, so that the multi-fiber connector 1 including the optical fibers 2 that are rotationally aligned with high accuracy can be provided.

Modifications

Figure 8:
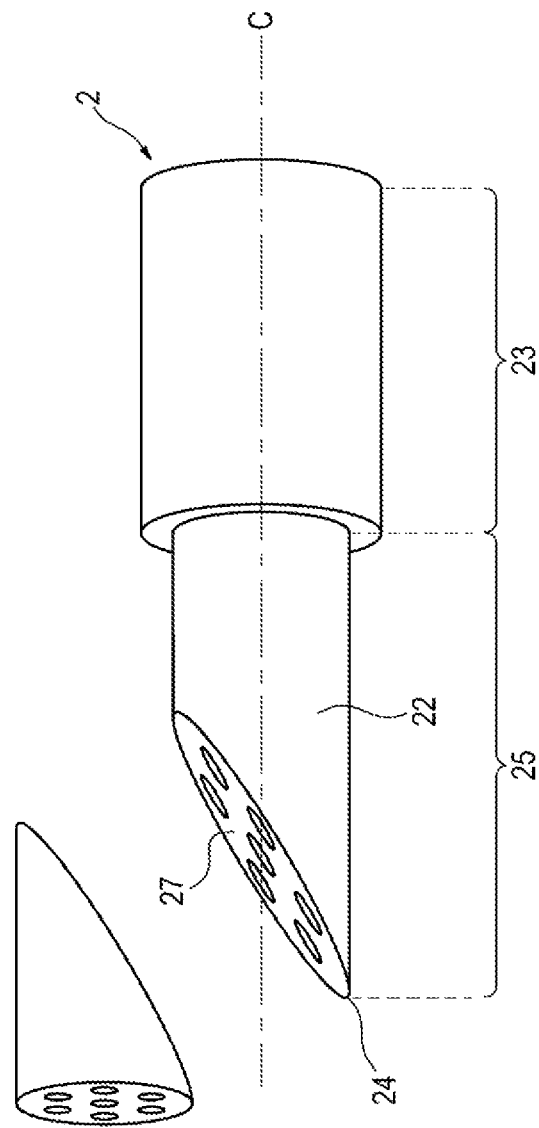
FIG. 8 is a conceptual diagram showing a first step in a modification of the manufacturing method for a multi-fiber connector.

In the first step shown in FIG. 4, the flat surface 26 is formed parallel to the central axis C of the optical fiber 2, but the present disclosure is not limited thereto. FIG. 8 is a diagram showing a modification of the first step of the manufacturing method for manufacturing the multi-fiber connector 1, and is a perspective view of the optical fiber 2 used for the multi-fiber connector 1. Elements substantially the same as or corresponding to those shown in FIG. 4 are denoted by the same reference numerals, and a repetitive description thereof will be omitted.

After it is confirmed by the camera 9 that the optical fiber 2 is rotationally aligned in a predetermined direction, as shown in FIG. 8, a part of the rotationally aligned optical fiber 2 is shaped such that a flat surface 27 is inclined with respect to the central axis C of the optical fiber 2. The flat surface 27 may be formed by removing all cores 21 of the optical fiber 2. An inclination angle of the flat surface 27 with respect to the central axis C is, for example, 60 degrees. A length of the flat surface 27 in the longitudinal direction is not particularly limited, as long as the flat surface 27 is formed such that the flat surface 27 does not exist in the positioning portion 31 when the optical fiber 2 is inserted into the positioning portion 31 of the positioning component 3 in the second step. Since the second step in the present example is the same as that in FIGS. 5A and 5B, the description thereof will be omitted.

Figure 9A:
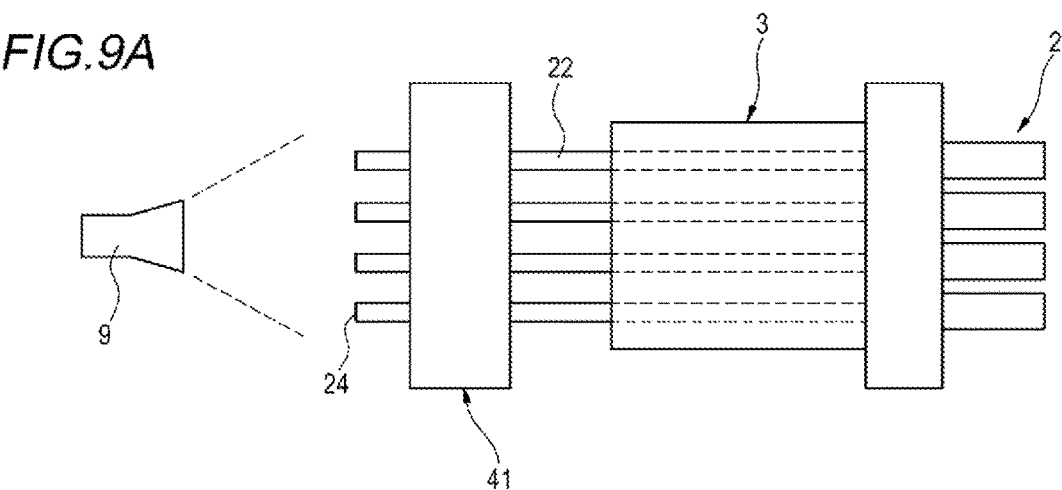
FIG. 9A is a diagram showing a third step and a fourth step in the modification of the manufacturing method for a multi-fiber connector, and is a plan view seen from a direction orthogonal to an arrangement plane of an optical fiber.
Figure 9B:
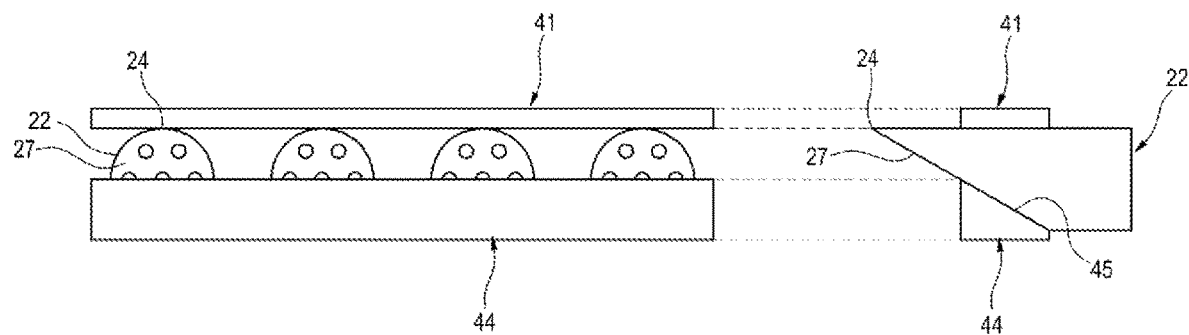
FIG. 9B is a front view and a side view of the optical fiber shown in FIG. 9A.

FIGS. 9A and 9B are diagrams showing a modification of the third step of the manufacturing method for manufacturing the multi-fiber connector 1. FIG. 9A is a plan view of the optical fibers 2 and the positioning component 3, together with the camera 9, viewed from the direction orthogonal to the arrangement plane of the optical fibers 2, and FIG. 9B is a front view of the optical fibers 2 shown by the camera 9 disposed toward the one end portion 24 of each optical fiber 2 shown in FIG. 9A and a side view of the vicinity of the one end portion 24 of the optical fiber 2 as viewed from an arrangement direction of the optical fibers 2. As shown in FIGS. 9A and 9B, a pair of jigs 41 and 44 is used in the modification of the third step. In a cross-sectional view of the optical fiber 2, the jig 41 is disposed on the circumference of the glass fiber 22, and the jig 44 is disposed on the flat surface 27 of the glass fiber 22. The jig 41 has a rectangular shape, and the jig 44 has a reference surface 45 formed on a surface facing the optical fibers 2 so as to be inclined in the longitudinal direction of the optical fibers 2. That is, the pair of jigs 41 and 44 disposed to face the positioning component 3 are arranged so as to sandwich the plurality of optical fibers 2 in an upper-lower direction. The jig 44 is disposed along the flat surface 27 formed to protrude from the positioning portion 31 toward the one end portion 24. At this time, as shown in FIG. 9B, each optical fiber 2 is rotationally aligned such that the flat surface 27 comes into contact with the reference surface 45 formed on the jig 44 (third step). In the present example, the reference plane 45 is disposed so as to be inclined with respect to the central axis C of each optical fiber. Since the flat surface 27 is also inclined with respect to the central axis C, all of the flat surfaces 27 of the plurality of optical fibers 2 are in contact with the reference surface 45, and the orientations thereof are unified. At this time, it is confirmed that the plurality of optical fibers 2 are appropriately rotationally aligned by the camera 9 disposed toward the one end portion 24. Since the fourth step and the fifth step in the present example are the same as the steps shown in FIGS. 6A to 7B, the description thereof will be omitted.

The flat surface 27 is inclined with respect to the central axis C of the optical fiber 2 in this manner, so that the reference surface 45 of the jig 44 can be guided along the inclined flat surface 27 from a distal end side of the optical fiber 2 toward the positioning component 3. Therefore, the work efficiency is improved, and the optical fibers 2 can be rotationally aligned with high accuracy.

Although the present disclosure has been described in detail with reference to a specific embodiment, it will be apparent to those skilled in the art that various changes and modifications can be made without departing from the spirit and scope of the present disclosure. The numbers, positions, shapes and the like of components described above are not limited to the above embodiment and can be changed to suitable numbers, positions, shapes and the like on a premise that the present disclosure is carried out.

What is claimed is:

1. A manufacturing method for manufacturing a multi-fiber connector by using a positioning component including a plurality of positioning portions configured to hold a plurality of optical fibers, each of the plurality of optical fibers being not axisymmetric, and each of the plurality of optical fibers including a glass fiber and a resin coating and having a covered portion in which the glass fiber is covered with the resin coating and a non-covered portion in which the glass fiber is exposed, the non-covered portion including one end portion of the optical fiber, the manufacturing method comprising:

shaping a part of each of the plurality of optical fibers such that a part of an outer peripheral surface of the glass fiber including the one end portion becomes a flat surface;

arranging each of the plurality of optical fibers in a respective one of the plurality of positioning portions of the positioning component such that the entire flat surface protrudes from the positioning component;

rotationally aligning each of the plurality of optical fibers such that the flat surface comes into contact with a reference surface of a jig disposed to face the positioning component;

fixing each of the plurality of optical fibers to the positioning component after rotationally aligning each of the plurality of optical fibers; and cutting and removing a part of the glass fiber which protrudes from the positioning component and includes the flat surface and grinding a cut surface of each of the plurality of optical fibers which is exposed from the positioning component, after fixing each of the plurality of optical fibers to the positioning component.

2. The manufacturing method for manufacturing a multi-fiber connector according to claim 1,
   wherein each of the plurality of optical fibers is a multi-core fiber.

3. The manufacturing method for manufacturing a multi-fiber connector according to claim 1,
   wherein the shaping the part of each of the plurality of optical fibers includes removing a part of at least one core of each of the plurality of optical fibers.

4. The manufacturing method for manufacturing a multi-fiber connector according to claim 1,
   wherein the flat surface of each of the plurality of optical fibers is parallel to a central axis of the optical fiber.

5. The manufacturing method for manufacturing a multi-fiber connector according to claim 1,
   wherein the flat surface of each of the plurality of optical fibers is inclined with respect to a central axis of the optical fiber.

6. The manufacturing method for manufacturing a multi-fiber connector according to claim 1,
   wherein the plurality of positioning portions are a plurality of holes or a plurality of grooves.

7. The manufacturing method for manufacturing a multi-fiber connector according to claim 1,
   wherein the shaping the part of each of the plurality of optical fibers includes removing the part of the outer peripheral surface of the glass fiber with laser light.

8. The manufacturing method for manufacturing a multi-fiber connector according to claim 1,
   wherein the shaping the part of each of the plurality of optical fibers includes grinding the part of the outer peripheral surface of the glass fiber with an optical connector grinding machine.

* * * * *